United States Patent [19]
Suzuki et al.

[11] Patent Number: 5,644,292
[45] Date of Patent: Jul. 1, 1997

[54] ALARM TERMINATION APPARATUS

[75] Inventors: Aya Suzuki; Toshiyuki Sakai; Yasutaka Yamagata, all of Kawasaki, Japan

[73] Assignee: Fujitsu Limited, Japan

[21] Appl. No.: 313,456

[22] Filed: Sep. 27, 1994

[30] Foreign Application Priority Data

Mar. 15, 1994 [JP] Japan ................................. 6-043490

[51] Int. Cl.[6] .................................................. G08B 29/00
[52] U.S. Cl. ........................ 340/506; 340/517; 340/518; 340/825.36; 364/140; 364/141
[58] Field of Search .................................. 340/517, 518, 340/506, 825.36; 364/140, 141

[56] References Cited

U.S. PATENT DOCUMENTS 4,303,990  12/1981  Seipp ........................ 364/900
5,299,193   3/1994  Szczepanek ................ 370/85.1

*Primary Examiner*—Brent A. Swarthout
*Assistant Examiner*—Daryl C. Pope
*Attorney, Agent, or Firm*—Greer, Burns & Crain, Ltd.

[57] ABSTRACT

An alarm termination apparatus includes: a bi-directionally accessible random access memory for storing alarm bits sampled from a plurality of parallel inputs at memory locations; a flip-flop circuit for temporarily storing a first alarm bit read from one of the memory locations of the memory and for outputting the first alarm bit to an output transmission line; and a selector for receiving a second alarm bit sampled from the parallel inputs and for receiving the stored first alarm bit from the flip-flop circuit, the selector selectively outputting the second alarm bit or the first alarm bit to the above one of the memory locations of the memory in accordance with a value of a select pulse, wherein the temporary storing of the first alarm bit from the memory into the flip-flop circuit and the selective outputting of the first alarm bit or the second alarm bit to the memory by the selector are controlled to sequentially take place.

7 Claims, 6 Drawing Sheets

ALARM TERMINATION APPARATUS

BACKGROUND OF THE INVENTION

(1) Field of the Invention

The present invention relates to an alarm termination apparatus in which alarm bits from multi-channel data are written to or read from a bi-directionally accessible random access memory. The alarm termination apparatus is applied to a data communication system and intended to ensure an increased speed of writing/reading the alarm bits in association with the random access memory.

(2) Description of the Prior Art

A data communication system is designed to combine a plurality of channel data into a high-speed data stream and transmit the data stream on a transmission line. Simultaneously, the data communication system inserts alarm bits, which contain supervising control information for each channel, into the high-speed data stream for transmission. Some node of the data communication system is provided with an alarm termination unit. In the alarm termination unit, the alarm bits are sampled from the received data stream, and different alarm bits specific to that node are inserted into the output data stream.

With the development of recent data communication systems having high-speed data processing functions, it is desired that the alarm termination unit which terminates data in high-speed data streams have the ability to process the alarm data at higher speeds. It is desired that the alarm termination unit can be built in a smaller circuit size.

FIG. 1 shows a part of a data communication system including an alarm termination unit to which the present invention is applied. In FIG. 1, a high-speed serial input data stream from a transmission line is converted by a serial-to-parallel (S/P) conversion unit 1 into "n" pieces of parallel data for several internal processing steps in the data communication system. A frame sync (synchronizing) detecting unit 2 detects synchronization of the parallel data during a receive operation by using frame bits from the parallel data. An alarm bit sampling unit 3 takes out alarm bits from the parallel data output from the frame sync detecting unit 2, and transfers the alarm bits to an alarm termination unit 4. On the other hand, the parallel data from the frame sync detecting unit 2 is transferred to a data receiving part (not shown) through the alarm bit sampling unit 3 for a data receiving process by the data receiving part.

The alarm termination unit 4 has an internal random access memory (RAM) for storing the alarm bits. In the alarm termination unit 4, the alarm bits, taken out from the parallel data, are written to the RAM at memory locations each specified by the parallel data. Thereafter, the alarm bits are read out from the RAM, and a step of processing the alarm bits is performed in association with a control unit 5. The read-out alarm bits are either updated or unchanged in accordance with select pulses supplied from the control unit 5 during the step, and the resulting alarm bits are transferred to an alarm bit multiplex unit 6.

In the data communication system, transmit data which will be transmitted on a transmission line is supplied from a data transmitting part (not shown) to the alarm bit multiplex unit 6. In the alarm bit multiplex unit 6, the alarm bits from the alarm termination unit 4 and the transmit data from the data transmitting unit are multiplexed. A frame bit generating unit 7 generates frame bits and inserts them into the multiplexed data from the alarm bit multiplex unit 6. A parallel-to-serial (P/S) conversion unit 8 converts them into serial data streams, and they are transmitted on the transmission line as the output data of the data communication system.

FIG. 2 shows a conventional alarm termination unit of a data communication system. This alarm termination unit uses a plurality of flip-flop circuits to allow the speed of processing alarm data to be increased.

In FIG. 2, a RAM (random access memory) 10 has data ports A and data ports B, and the RAM 10 is bi-directionally accessible. In the RAM 10, for example, first data can be written to the data ports A of the memory and the first data can be read from the data ports A of the memory, and at the same time second data can be written to the data ports B of the memory and the data can be read from the data ports B of the memory. A write address unit 11 generates a write address at which an alarm bit is written to the ports A of the RAM 10. A read address unit 12 generates a read address at which an alarm bit is read from the ports A of the RAM 10. A write address unit 13 generates a write address at which an alarm bit is written to the ports B of the RAM 10. A read address unit 14 generates a read address at which an alarm bit is read from the ports B of the RAM 10.

In FIG. 2, a high-speed serial input data stream #1 is supplied to a serial-to-parallel (S/P) conversion unit 15. The S/P conversion unit 15 converts the high-speed serial input data stream #1 into "n" low-speed parallel inputs. The low-speed parallel inputs are sent to "n" flip-flop (FF) circuits 16, and the inputs are temporarily stored in the flip-flop circuits 16, respectively. The "n" parallel inputs stored in the flip-flop circuits 16 are simultaneously sent to the RAM 10 via a selector 17, and they are written to the ports A of the RAM 10, respectively.

The stored parallel inputs are read out from the ports A of the RAM 10, and they are sent to "n" flip-flop (FF) circuits 18 via the selector 17. The "n" pieces of the read data are temporarily stored in the flip-flop circuits 18, and they are simultaneously sent to a parallel-to-serial (P/S) conversion unit 19. The P/S conversion unit 19 converts the "n" pieces of the read data into a high-speed serial output data stream #1. Then, the high-speed serial output data stream #1 is transmitted on a transmission line.

In a similar manner, the stored parallel inputs are read out from the ports B of the RAM 10, and they are sent to "n" flip-flop (FF) circuits 21 via a selector 20. The "n" pieces of the read data are temporarily stored in the flip-flop circuits 21, and are simultaneously sent to a parallel-to-serial (P/S) conversion unit 22. The P/S conversion unit 22 converts the "n" pieces of the parallel data into a high-speed serial output data stream #2. Then, the high-speed serial output data stream #2 is transmitted on the transmission line.

On the other hand, a high-speed serial input data stream #2 is supplied to a serial-to-parallel (S/P) conversion unit 23. The S/P conversion unit 23 converts the high-speed serial input data stream #2 into "n" low-speed parallel inputs. The low-speed parallel inputs are sent to "n" flip-flop (FF) circuits 24, and the inputs are temporarily stored in the flip-flop circuits 24, respectively. The "n" parallel inputs stored in the flip-flop circuits 24 are simultaneously sent to the RAM 10 through the selector 20, and they are written to the ports B of the RAM 10.

The stored parallel inputs are read out from the ports B of the RAM 10, and they are sent to the flip-flop circuits 21 via the selector 20. The "n" pieces of the parallel data are temporarily stored in the flip-flop circuits 21, and they are simultaneously sent to the P/S conversion unit 22. The P/S conversion unit 22 converts the "n" pieces of the parallel data into a high-speed serial output data stream #2 for transmission.

Similarly, the stored parallel inputs are read out from the ports A of the RAM 10, and they are sent to the flip-flop circuits 18 via the selector 17. The "n" pieces of the parallel data are temporarily stored in the flip-flop circuits 18, and are simultaneously sent to the P/S conversion unit 19. The P/S conversion unit 19 converts the "n" pieces of the parallel data into a high-speed serial output data stream #1 for transmission.

During the read and write operations described above, the write address unit 11 sends a write address signal indicating a write address relating to the ports A, to the RAM 10 via an OR circuit 25, and the read address unit 12 sends a read address signal indicating a read address relating to the ports A, to the RAM 10 via the OR circuit 25. The write address unit 13 sends a write address signal indicating a write address relating to the ports B, to the RAM 10 via an OR circuit 26, and the read address unit 14 sends a read address signal indicating a read address relating to the ports B, to the RAM 10 via the OR circuit 26.

As described above, the stored alarm bits are read out from the RAM 10, and a step of processing the alarm bits is performed in association with the control unit 5. During the step, the read-out alarm bits are either updated or unchanged in accordance with select pulses from the control unit 5. When a select pulse indicating non-update is output from the control unit 5, the alarm bit is unchanged and it is transferred to the alarm bit multiplex unit 6 On the other hand, when a select pulse indicating update is output from the control unit 5, the alarm bit is updated and the updated alarm bit is transferred to the alarm bit multiplex unit 6.

The conventional alarm bit termination unit described above uses a bi-directionally accessible RAM and accepts different write addresses for the data ports A and B of the RAM during a write procedure. The unit also accepts different read addresses for the data ports A and B of the RAM during a read procedure. Therefore, it is necessary that the read procedure for the RAM is performed after the write procedure for the RAM is completed.

If the write and read procedures for the RAM are performed at the same time, the conventional alarm bit termination unit is in danger of erroneously deleting the content of the alarm information or losing it. The conventional alarm termination unit must perform the write procedure and the read procedure in separate operating cycles, in order to safely carry out the alarm termination task. Therefore, the conventional alarm bit termination unit inevitably requires a certain time delay to complete the alarm termination task.

In order to eliminate the time delay mentioned above, the conventional alarm termination unit uses a plurality of flip-flop circuits for both the inputs and the outputs. With the use of the plurality of flip-flop circuits in the alarm termination unit, the "n" pieces of the parallel data are temporarily stored in the flip-flop circuits, and are simultaneously written to the RAM, in order to allow the rate of processing the alarm bits to be increased. Because of the many flip-flop circuits, it is necessary that the conventional alarm termination unit have a large circuit size. In addition, the conventional alarm termination unit includes the write and read address units 11 and 12 for the ports A and the write and read address units 13 and 14 for the ports B. Because of the many address units, it is necessary that the conventional alarm termination unit have a large circuit size.

SUMMARY OF THE INVENTION

Accordingly, it is a general object of the present invention to provide an improved alarm termination apparatus in which the above described problem is eliminated.

Another, more specific object of the present invention is to provide an alarm termination apparatus which allows an increased speed for processing alarm data by minimizing the time necessary to write alarm bits to and read the alarm bits from a random access memory which is bi-directionally accessible.

Still another object of the present invention is to provide an alarm termination apparatus which allows the alarm termination circuit size to be remarkably reduced but maintains the ability of high-speed alarm data processing.

A further object of the present invention is to provide an alarm termination apparatus which eliminates accidental damage or deletion of the stored alarm bits in the memory and maintains a small alarm termination circuit size.

The above mentioned object of the present invention is achieved by an alarm termination apparatus which includes: a data communication system in which a plurality of parallel inputs from a plurality of channels are received, alarm bits are sampled from the parallel inputs, the alarm bits are processed, and the processed alarm bits are inserted into a plurality of parallel outputs, the data communication system comprising a control unit which outputs a select pulse with respect to each of the parallel inputs, the select pulse indicating one of two distinct values; a bi-directionally accessible random access memory for storing alarm bits sampled by the data communication system at memory locations; a flip-flop circuit for temporarily storing a first alarm bit read from one of the memory locations of the memory and for outputting the first alarm bit to an output transmission line; and a selector for receiving a second alarm bit sampled from the parallel inputs from an input transmission line and for receiving the temporarily stored first alarm bit from the flip-flop circuit, the selector selectively outputting the second alarm bit or the first alarm bit to the above one of the memory locations of the memory in accordance with the value of the select pulse, wherein the temporary storing of the first alarm bit from the memory into the flip-flop circuit and the selective outputting of the first alarm bit or the second alarm bit to the memory by the selector are controlled to sequentially take place.

According to the present invention, it is possible to minimize the time necessary to write alarm bits to and read the alarm bits from the bi-directionally accessible random access memory, so that the speed of alarm data processing is increased. In addition, it is possible to remarkably reduce the alarm termination circuit size with the ability of high-speed alarm data processing being maintained. Further, it is possible that the alarm termination circuit size is remarkably reduced and the possibility of the stored alarm bits in the memory being damaged or deleted is eliminated.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

A description will now be given of a first embodiment of an alarm termination apparatus according to the present invention with reference to FIGS. 3 through 5.

Figure 3:
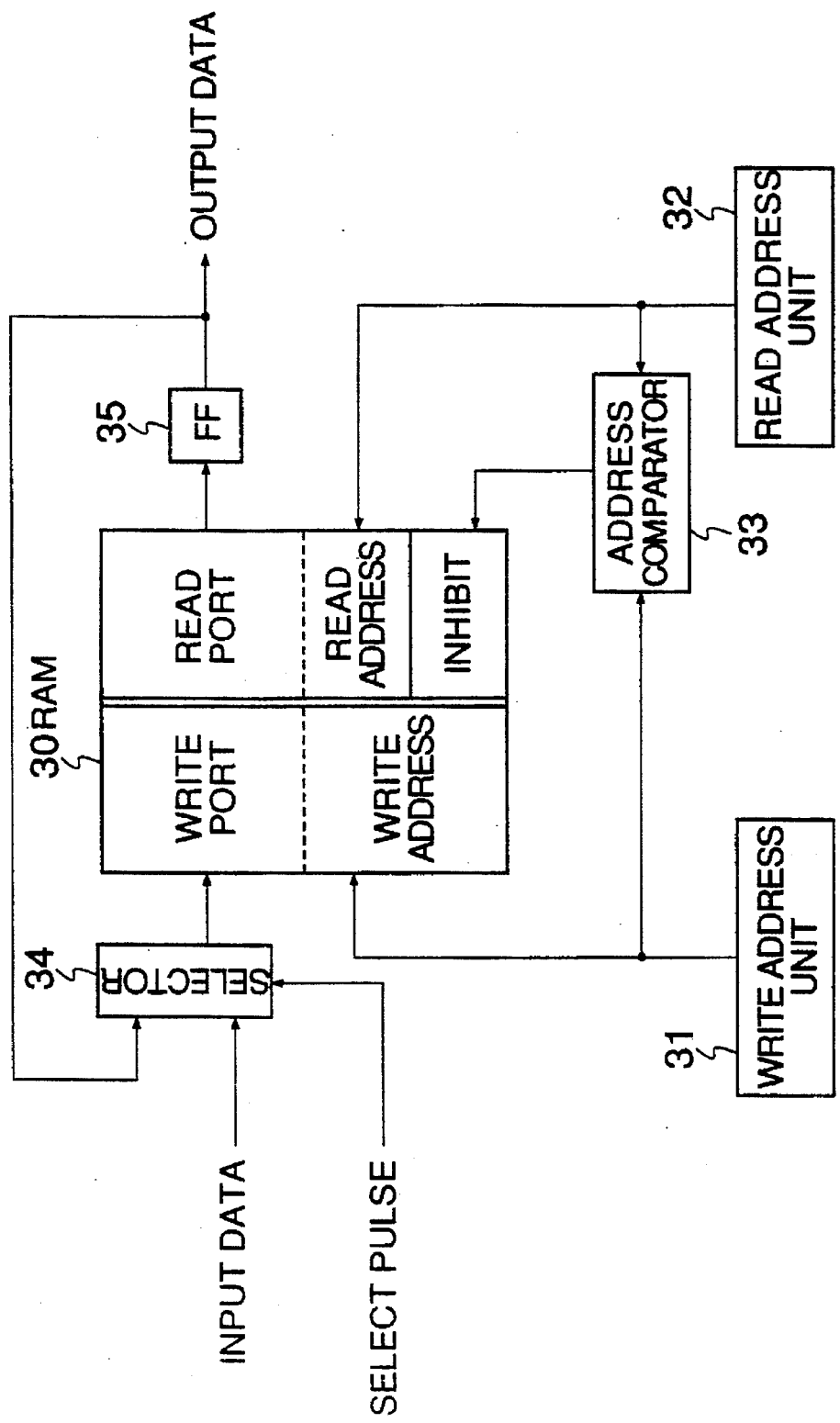
FIG. 3 is a block diagram showing an alarm termination apparatus according to the present invention.

FIG. 3 shows an alarm termination apparatus provided within a data communication system to which the present invention is applied. In FIG. 3, the alarm termination apparatus comprises a random access memory (RAM) 30, a write address unit 31, a read address unit 32, a selector 34, and a flip-flop (FF) circuit 35. Generally, a plurality of selectors and a plurality of flip-flop circuits which relate to a corresponding number of channels used are provided in the alarm termination apparatus. However, only the single selector 34 and the single flip-flop circuit 35 are shown in FIG. 3 and the other selectors and the other flip-flop circuits are omitted therein for the sake of convenience.

Figure 2:
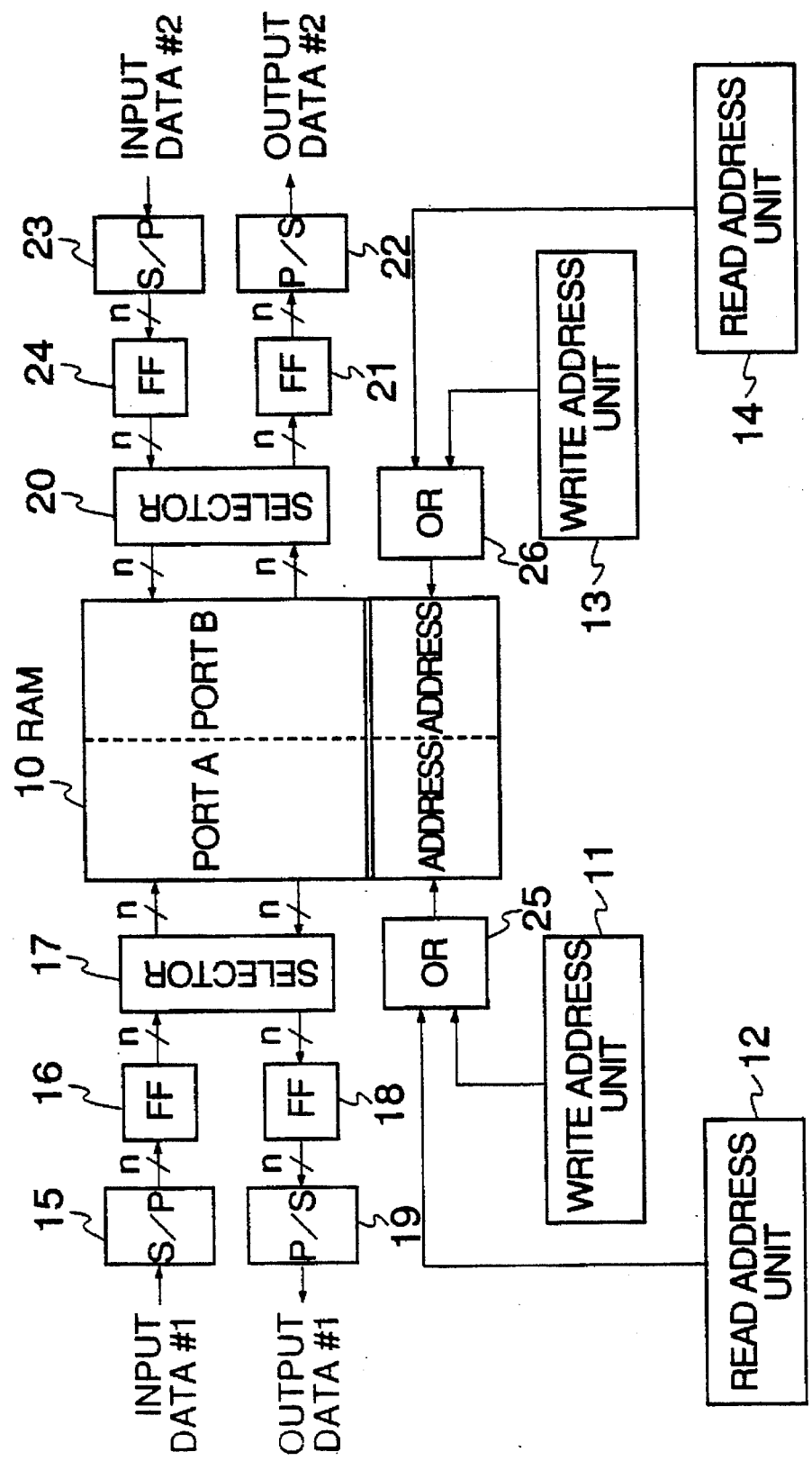
FIG. 2 is a circuit diagram showing a conventional alarm termination unit of a data communication system.

In FIG. 3, the RAM 30 is bi-directionally accessible, which is similar to the RAM 10 in FIG. 2. In the RAM 30, alarm bits which are sampled by the data communication system from each of parallel inputs relating to the plurality of the channels are stored at memory locations of the RAM 30. The write address unit 31 generates a write address indicating one of the memory locations of the RAM 30 at which one alarm bit is written to the RAM 30. The write address unit 31 outputs the write address to the RAM 30 with respect to each of the plurality of the channels. The read address unit 32 generates a read address indicating one of the memory locations of the RAM 30 at which one alarm bit is read from the RAM 30. The read address unit 32 outputs the read address to the RAM 30 with respect to each of the plurality of the channels.

The flip-flop circuit 35 temporarily stores a first alarm bit read from one of the memory locations of the RAM 30, and outputs the first alarm bit to an output transmission line. The selector 34 receives a second alarm bit sampled from the parallel inputs from an input transmission line and receives the temporarily stored first alarm bit from the flip-flop circuit 35 at the same time. The selector 34 selectively outputs either the second alarm bit or the first alarm bit to the above one of the memory locations of the RAM 30 in accordance with a value of a select pulse.

In the alarm termination apparatus described above, the temporary storing of the first alarm bit from the RAM 30 into the flip-flop circuit 35 and the selective outputting of either the first alarm bit or the second alarm bit to the RAM 30 by the selector 34 are controlled so that the temporary storing and the selective outputting sequentially take place. Therefore, the alarm termination apparatus according to the present invention realizes that the reading of one alarm bit from the RAM 30 and the writing of the corresponding alarm bit to the RAM 30 sequentially takes place, and realizes that the outputting of the corresponding alarm bit to the output transmission line can be quickly performed with a time delay of one clock cycle.

Figure 1:
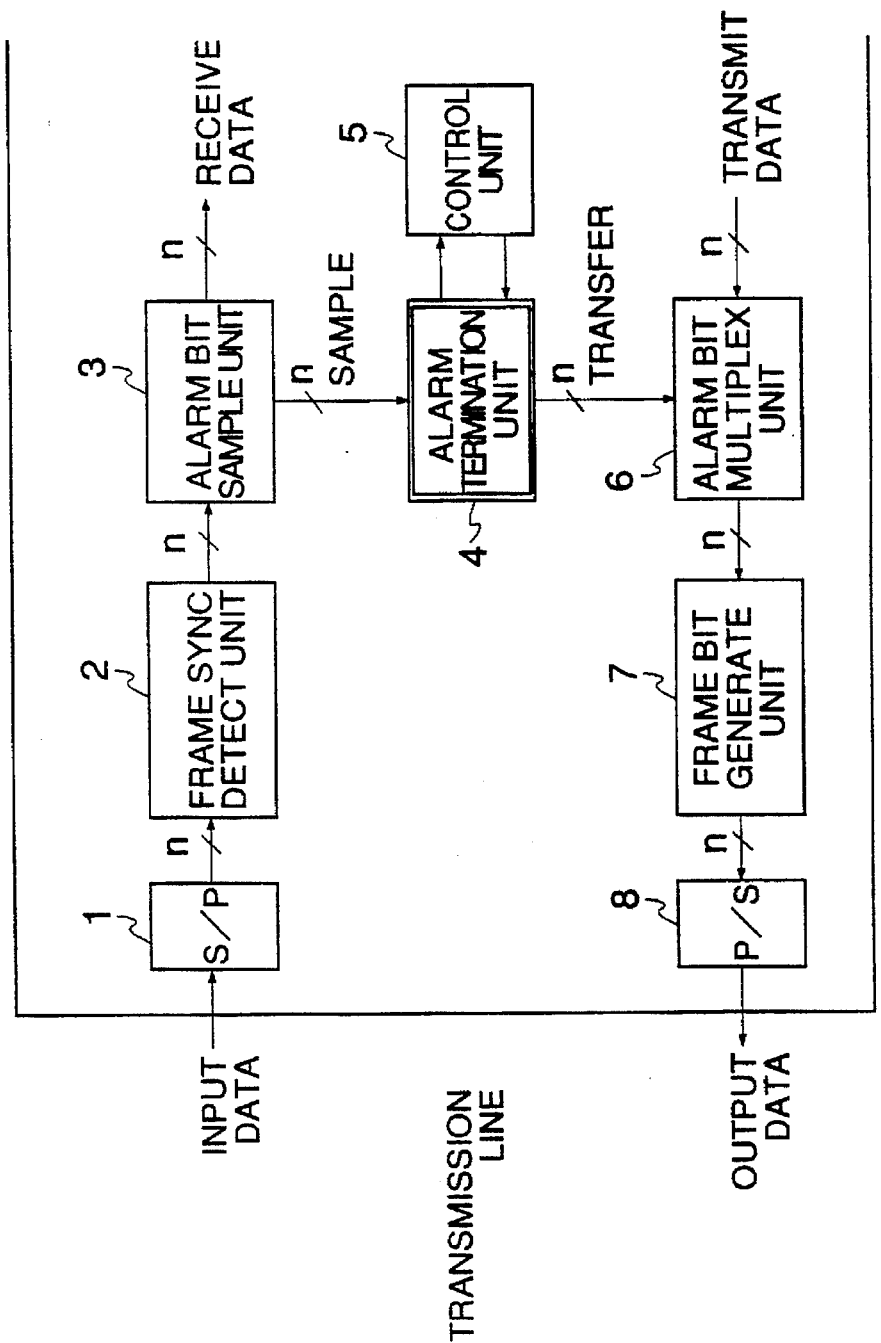
FIG. 1 is a block diagram showing a data communication system to which the present invention is applied.

Within the data communication system shown in FIG. 1, the alarm termination unit 4 is required to always receive the latest alarm bits from the alarm bit sampling unit 3, in order to carry out the alarm bit processing and alarm bit transfer to the alarm bit multiplex unit 6. The alarm termination apparatus according to the present invention uses one read/write port of the bi-directionally accessible RAM 30 as the write-only port (alarm bits are written to the read/write port in only one direction), and uses the other read/write port thereof as the read-only port (alarm bits are read from the read/write port in only one direction).

In the alarm termination apparatus according to the present invention, it is not necessary to simultaneously read out from the bi-directionally accessible RAM the alarm bits relating to the plurality of the channels. Thus, it is not necessary to synchronize the read/write timings of the alarm bits relating to the plurality of the channels with respect to the bi-directionally accessible RAM. Therefore, it is possible that the alarm termination apparatus according to the present invention minimizes the time needed to write the alarm bits to and read the alarm bits from the bi-directionally accessible RAM memory, so that the speed of alarm data processing is remarkably increased.

In addition, in the alarm termination apparatus described above, it is not necessary to provide a flip-flop circuit for storing an alarm bit before being written to the RAM, and it is sufficient to provide the write-side port of the RAM with a single write address unit and provide the read-side port of the RAM with a single read address unit. Therefore, it is possible to remarkably reduce the alarm termination circuit size with the ability of high-speed alarm data processing being maintained.

In addition, when the timings of updating the stored alarm bits of the RAM relating to the plurality of the channels are different from each other as in the alarm termination apparatus described above, it is likely that some of the stored alarm bits in the RAM are unnecessarily damaged or deleted if all the stored alarm bits of the RAM are simultaneously updated in accordance with the select pulses. However, in the alarm termination apparatus according to the present invention, an alarm bit read from each of the memory locations of the RAM is temporarily stored in the flip-flop circuit 35, and the selector 34 selectively outputs either the temporarily stored alarm bit or the alarm bit newly sampled from the parallel inputs from the input transmission line to the RAM 30 in accordance with the value of the select pulse. When the value of the select pulse indicates the updating of the alarm bit in the RAM, the selector 34 outputs the newly sampled alarm bit to the RAM. When the value of the select pulse indicate the non-updating of the alarm bit in the RAM, the selector 34 outputs the temporarily stored alarm bit to the RAM. Therefore, it is possible that the alarm termination circuit size is remarkably reduced and the possibility of the stored alarm bits in the memory being damaged or deleted is eliminated.

In FIG. 3, the alarm termination apparatus further comprises an address comparator 33 having two inputs: one input connected to one output of the write address unit 31, and the other connected to one output of the read address unit 32. The address comparator 33 has an output which is connected to a read inhibit port of the RAM 30. The address comparator 33 compares a write address generated by the write address unit 31 with a read address generated by the read address unit 32, and outputs a read inhibit signal to the read inhibit port of the RAM 30 when the write address is detected to be in accordance with the read address, so as to prevent the reading of one alarm bit from the RAM 30 into the flip-flop circuit 35 at that time. When the RAM 30 receives a read inhibit signal from the address comparator 33, one alarm bit is inhibited from being read from the RAM 30 at the corresponding memory location into the flip-flop circuit 35 at that time.

In a case in which the bi-directionally accessible RAM 30 is used by the alarm termination apparatus, if the write address generated by the write address unit is the same as the read address generated by the read address unit, it is likely that the stored alarm bit of the RAM is damaged or deleted by the alarm bit processing. However, the address comparator 33 of the alarm termination apparatus according to the present invention outputs a read inhibit signal to the RAM 30 when the write address is detected to be in accordance with the input address, so that the reading of the alarm bit from the RAM 30 into the flip-flop circuit 35 at that time is prevented. Therefore, it is possible to prevent the stored alarm bit of the RAM from being damaged or deleted at that time.

Figure 4:
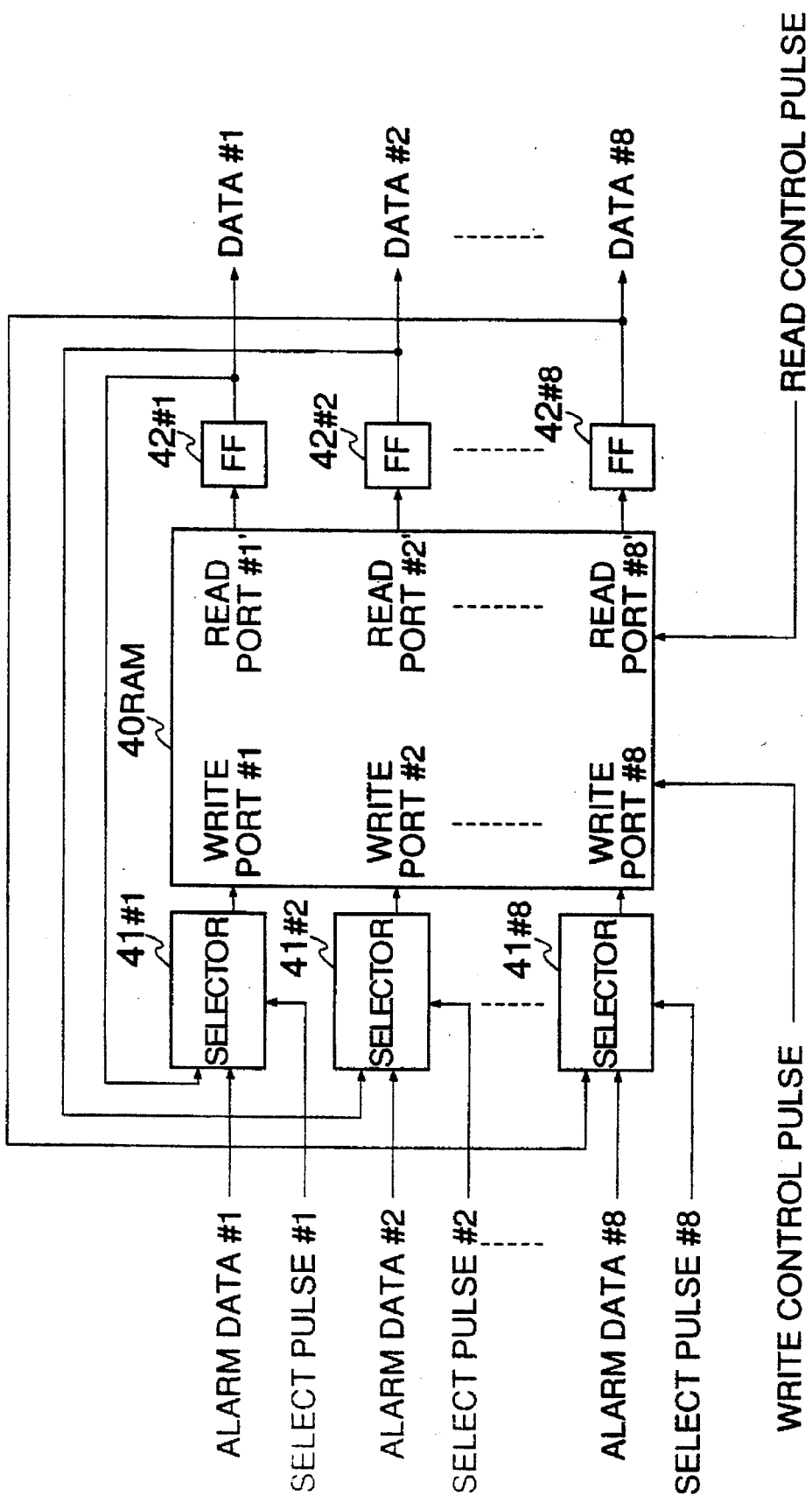
FIG. 4 is a circuit diagram showing a first embodiment of the alarm termination apparatus according to the present invention.

FIG. 4 shows a first embodiment of the alarm termination apparatus according to the present invention. This alarm termination apparatus processes alarm bits #1 through #8 relating to eight channels #1 through #8 of the data communication system, and transfers the processed alarm bits #1 through #8 to an output transmission line.

In FIG. 4, the alarm termination apparatus comprises a random access memory (RAM) 40 which is bi-directionally accessible, eight selectors 41#1 through 41#8 each of which selectively outputs either the sampled alarm bit from an input transmission line or the temporarily stored alarm bit to one of the memory locations of the RAM 40 in accordance with a value of a select pulse, and eight flip-flop (FF) circuits 42#1 through 42#8 each of which temporarily stores an alarm bit read from one of the memory locations of the RAM 40 and outputs the alarm bit to the output transmission line. A write control pulse indicating one of the memory locations of the RAM 40 at which one alarm bit is written to the RAM 40, and a read control pulse indicating one of the memory locations of the RAM 40 at which one alarm bit is read from the RAM 40 are input to the RAM 40.

As shown in FIG. 4, the outputs of the selectors 41#1 through 41#8 are respectively connected to write ports #1 through #8 of the RAM 40, and the inputs of the flip-flop circuits 42#1 through 42#8 are respectively connected to read ports #1' through #8' of the RAM 40. The outputs of the flip-flop circuits 42#1 through 42#8 are respectively connected to the inputs of the selectors 41#1 through 41#8. The select pulses #1 through #8 from a control unit (not shown in FIG. 4) are respectively supplied to the inputs of the selectors 41#1 through 41#8, and the sampled alarm data #1 through #8 are respectively supplied to the inputs of the selectors 41#1 through 41#8.

Figure 5:
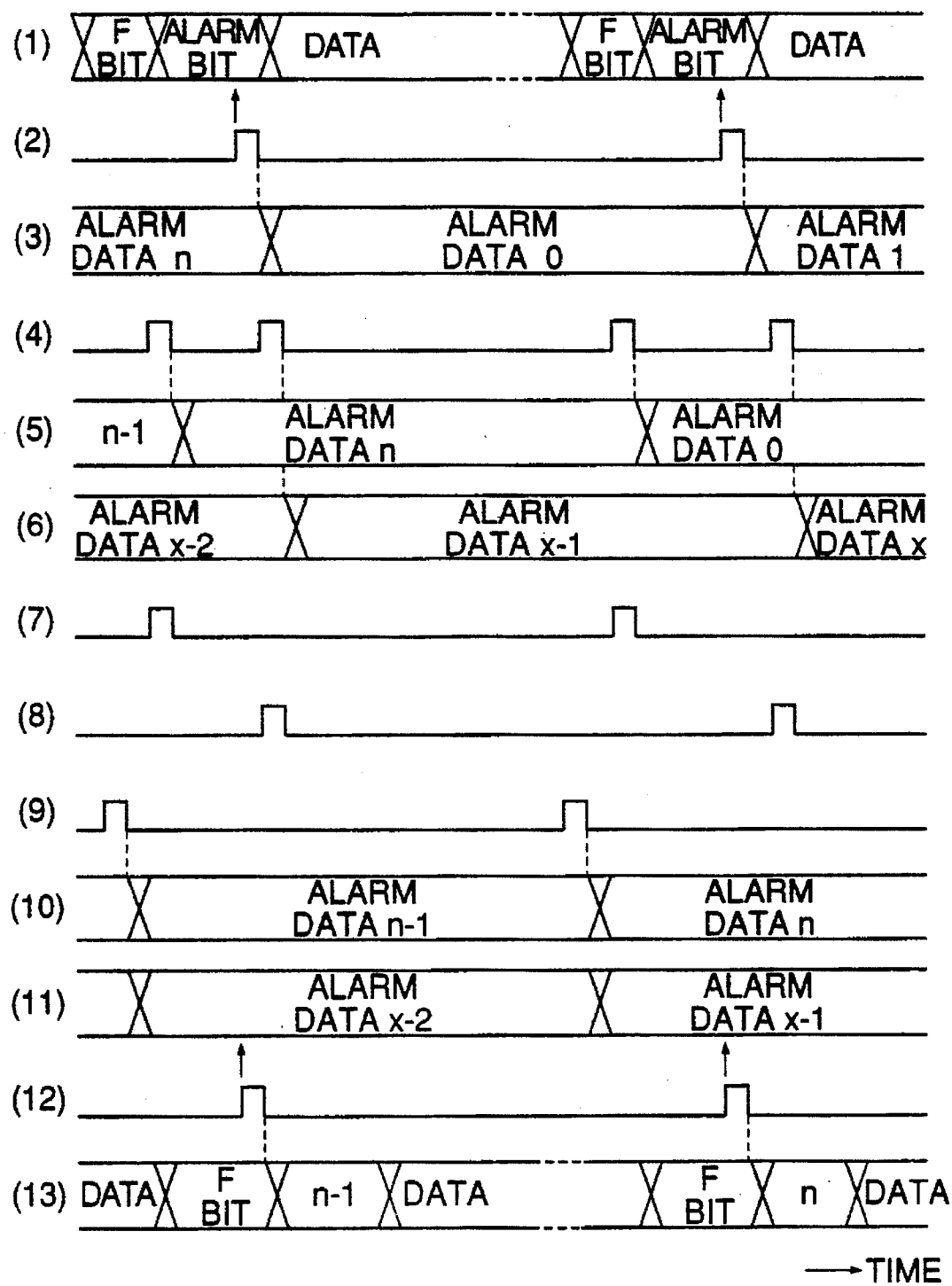
FIG. 5 is a time chart for explaining the operation of the alarm termination apparatus in FIG. 4.

FIG. 5 is a time chart for explaining the operation of the alarm termination apparatus shown in FIG. 4. A plurality of input signals, a plurality of intermediate signals, and a plurality of output signals of the alarm termination apparatus with respect to the channel #1 only are shown in FIG. 5 for the sake of convenience. More specifically, the signal (1) in FIG. 5 indicates the input data of the data communication system relating to the channel #1, the signal (2) in FIG. 5 indicates the alarm bit sample pulse relating to the above signal (1), the signal (3) in FIG. 5 indicates the sampled alarm data #1 relating to the channel #1, the signal (4) in FIG. 5 indicates the write control pulse input to the RAM 40, the address signals (5) and (6) in FIG. 5 respectively indicate the write ports #1 and #2 of the RAM 40 to which the alarm bits are written, the signal (7) in FIG. 5 indicates the select pulse #1 input to the selector 41#1, the signal (8) in FIG. 5 indicates the select pulse #2 input to the selector 41#2, the signal (9) in FIG. 5 indicates the read control pulse input to the RAM 40, the signal (10) in FIG. 5 indicates the alarm bit output from the flip-flop circuit 42#1, the signal (11) in FIG. 5 indicates the alarm bit output from the flip-flop circuit 42#2, the signal (12) in FIG. 5 indicates the alarm bit multiplex pulse, and the signal (13) in FIG. 5 indicates the output data of the data communication system relating to the channel #1.

The operation of the alarm termination apparatus in the first embodiment of the present invention will be described below with reference to FIGS. 4 and 5.

The input data (the signal (1) in FIG. 5) is a high-speed serial input data stream supplied to the data communication system before the serial-to-parallel conversion is performed. The alarm data #1 (the signal (3) in FIG. 5) is sampled from the input data in accordance with the alarm bit sample pulse (the signal (2) in FIG. 5) from the control unit (not shown) of the data communication system.

The control unit (not shown) of the data communication system generates the select pulses #1 through #8 which are supplied to the selectors 41#1 through 41#8. Each of the select pulses #1 through #8 indicates one of two distinct values. When the selector 41#1 receives a select pulse indicating a low-level value, the selector 41#1 outputs the temporarily stored alarm bit, supplied from the flip-flop circuit 42#1, to the RAM 40. On the other hand, when the selector 41#1 receives a select pulse indicating a high-level value, the selector 41#1 outputs the sampled alarm bit, supplied from the input transmission line, to the RAM 40. Before the updating of the alarm bits of the RAM 40 (or the writing of new alarm bits to the RAM) is performed, the stored alarm bits relating to each of the channels are read out from the RAM 40 and temporarily stored in the flip-flop circuits 42#1 through 42#8.

For example, the selector 41#1 outputs the sampled alarm bit #1 to the RAM 40 in accordance with the select pulse #1 (the signal (7) in FIG. 5), and the sampled alarm bit #1 is written to the write port #1 of the RAM 40 in accordance with the write control pulse (the signal (4) in FIG. 5). The address signals (5) and (6) in FIG. 5 respectively indicate the write ports #1 and #2 of the RAM 40 to which the alarm bits are written.

When the sampled alarm bit is written to the write port #1 of the RAM 40, the selector 41#2 outputs the temporarily stored alarm bit, supplied from the flip-flop circuit 42#2, to the RAM 40 in accordance with the select pulse #2 (the signal (13) in FIG. 5), and the temporarily stored alarm bit is written to the write port #2 of the RAM 40 in accordance with the write control pulse. Thus, the stored alarm bit of the RAM 40 at the memory location remains unchanged, that is, the alarm bit is not updated at this time.

The alarm bit output from the flip-flop circuit 42#1 (the signal (10) in FIG. 5) is inserted into the transmit data by the alarm bit multiplex unit in accordance with the alarm bit multiplex pulse (the signal (12) in FIG. 5). The alarm bit multiplex pulse is supplied from the control unit 5 of the data communication system to the alarm bit multiplex unit 6. The output data (the signal (13) in FIG. 5) relating to the channel #1 is thus produced in the data communication system.

Figure 6:
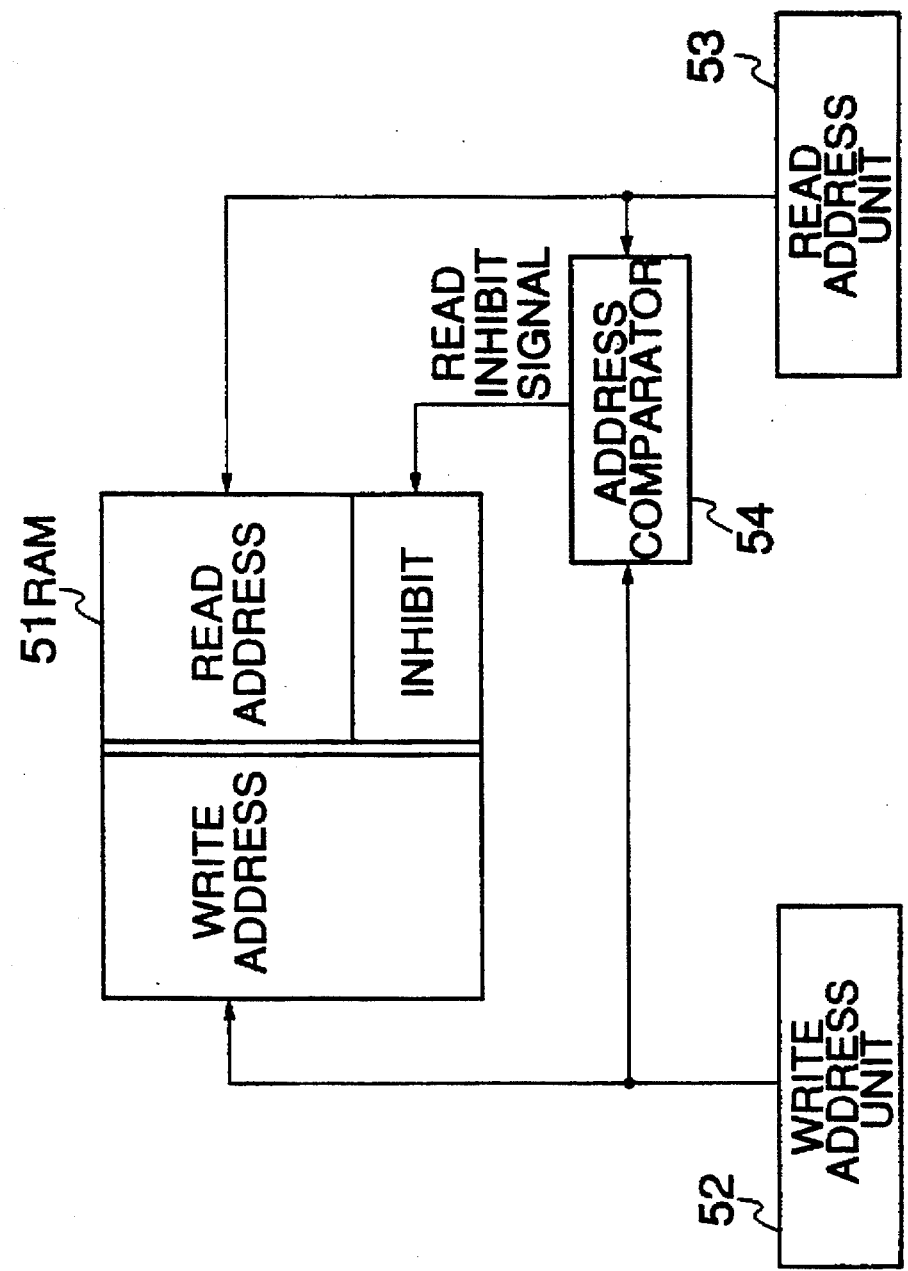
FIG. 6 is a block diagram showing a second embodiment of the alarm termination apparatus according to the present invention.

Next, a description will be given of a second embodiment of the present invention with reference to FIG. 6. FIG. 6 shows an alarm termination apparatus in the second embodiment of the present invention which is intended to prevent the collision between the write address and the read address relating to the bi-directionally accessible random access memory.

In FIG. 6, the alarm termination apparatus comprises a bi-directionally accessible random access memory (RAM) 51, a write address unit 52, a read address unit 53, and an address comparator 54. The RAM 51 is similar to the RAM 40 in FIG. 4 and stores alarm bits, sampled from parallel inputs from a plurality of channels, at memory locations.

The write address unit 52 generates a write address indicating one of the memory locations at which one alarm bit is written to the RAM 51, and outputs the write address to the RAM 51 with respect to each of the channels. The read address unit 53 generates a read address indicating one of the memory locations at which one alarm bit is read from the RAM 51, and outputs the read address to the RAM 51 with respect to each of the channels. The address comparator 54 compares a write address generated by the write address unit 52 with a read address generated by the read address unit 53, and outputs a read inhibit signal to the RAM 51 when the write address accords with the read address. When the read inhibit signal from the address comparator 54 is present at an inhibit port of the RAM 51, the alarm bit is inhibited from being read out from the RAM 51. Thus, the alarm termination apparatus in the second embodiment prevents the collision between the write address and the read address relating to the RAM 51.

Generally, in a conventional RAM which is bi-directionally accessible, a bit of data is inhibited from being written to the RAM 51 when the write address accords with the read address, in order to prevent the stored data in the memory from being damaged or deleted by the writing. On the other hand, in the second embodiment in FIG. 6, when the write address accords with the read address, the alarm bit is inhibited from being read out from the RAM 51. At this time, the temporary storing of the alarm bit in the flip-flop circuit is not performed, and the previously read-out alarm bit is stored in the flip-flop circuit. Thus, in the second embodiment, it is possible to prevent the stored alarm bit at the write-side port of the RAM 51 from being damaged or deleted due to the writing of the temporary stored alarm bit to the memory.

Accordingly, the alarm termination apparatus in the second embodiment described above prevents the stored alarm bits in the memory from being damaged or deleted, and it is possible that the alarm termination circuit size is remarkably reduced and the possibility of the stored alarm bits in the memory being damaged or deleted is eliminated.

Further, the present invention is not limited to the above described embodiments, and variations and modifications may be made without departing from the scope of the present invention.

What is claimed is:

1. An alarm termination apparatus of a data communication system in which a plurality of parallel inputs from a plurality of channels are received, alarm bits from the parallel inputs are processed, and the processed alarm bits are inserted into a plurality of parallel outputs, said apparatus comprising;

a bi-directionally accessible random access memory for storing the alarm bits at memory locations, wherein said memory includes a plurality of write ports to which the alarm bits are written, a plurality of read ports from which the alarm bits are read, and a read inhibit port;

a flip-flop circuit, having an input connected to one of said read ports of said memory and an output connected to an output transmission line, for temporarily storing a first alarm bit read from said one of said read ports and for outputting said first alarm bit to said output transmission line; and a selector, having an input connected to an input transmission line, an input connected to said output of said flip-flop circuit, and an output connected to one of said write ports of said memory at one of said memory locations corresponding to said one of said read ports, for receiving a second alarm bit from said input transmission line and for receiving said temporarily stored first alarm bit from said output of said flip-flop circuit, said selector selectively outputting one of said second alarm bit and said first alarm bit to one of said write ports of said memory in accordance with a value of a select pulse, said select pulse being supplied from the data communication system to another input of said selector;

wherein said temporary storing of said first alarm bit from said memory by said flip-flop circuit and said selective outputting of one of said first alarm bit and said second alarm bit to the memory by said selector are controlled to sequentially take place.

2. An alarm termination apparatus according to claim 1, further comprising an address comparator, having an output connected to said read inhibit port of said memory, for comparing a write address indicating one of said memory locations at which one alarm bit is written to said memory with a read address indicating one of said memory locations at which one alarm bit is read from said memory, said address comparator outputting a read inhibit signal to said read inhibit port of said memory when said write address accords with said read address, to prevent said one alarm bit from being read from said one of said memory of locations of said memory.

3. An alarm termination apparatus according to claim 1, further comprising:

a write address unit, having an output connected to said memory, for generating a write address indicating one of said memory locations at which one alarm bit is written to said memory, and for outputting said write address to said memory with respect to each of the plurality of channels; and a read address unit, having an output connected to said memory, for generating a read address indicating one of said memory locations at which one alarm bit is read from said memory, and for outputting said read address to said memory with respect to each of the plurality of channels.

4. An alarm termination apparatus according to claim 3, further comprising an address comparator having an input connected to said output of said write address unit, an input connected to said output of said read address unit, and an output connected to said read inhibit port of said memory, said address comparator comparing a write address generated by said write address unit with a read address generated by said read address unit, and outputting a read inhibit signal to said read inhibit port of said memory when said write address accords with said read address, to prevent said one alarm bit from being read from one of said memory locations of said memory.

5. An alarm termination apparatus according to claim 1, wherein said alarm termination apparatus comprises a plurality of flip-flop circuits having inputs connected to said read ports of said memory and a plurality of selectors having outputs connected to said write ports of said memory, both the number of said flip-flop circuits and the number of said selectors being the same as the number of the channels.

6. An alarm termination apparatus according to claim 5, wherein said temporary storing of said first alarm bit from said memory is performed by each of said plurality of flip-flop circuits, and said selective outputting of one of said first alarm bit and said second alarm bit to said memory is performed by each of said plurality of selectors.

7. An alarm termination apparatus according to claim 1, wherein the data communication system comprises a control unit which outputs a select pulse to said selector with respect to each of the parallel inputs, the select pulse indicating one of two distinct values.

* * * * *